United States Patent

[11] 3,599,766

| [72] | Inventors | William Edwin Ely<br>Troy;<br>Richard E. Frazier, Pleasant Hill, both of, Ohio |
|---|---|---|
| [21] | Appl. No. | 854,536 |
| [22] | Filed | Sept. 2, 1969 |
| [45] | Patented | Aug. 17, 1971 |
| [73] | Assignee | The B. F. Goodrich Company<br>New York, N.Y. |

[54] SEGMENTED FRICTION MEMBER FOR BRAKE OR CLUTCH
3 Claims, 4 Drawing Figs.

[52] U.S. Cl. .................................................. 192/107 R,
188/218 XL, 188/264 CC
[51] Int. Cl. ...................................................... F16d 13/64

[50] Field of Search ............................................ 192/107;
188/218 XL, 264 CC

[56] References Cited
UNITED STATES PATENTS

| 2,015,890 | 10/1935 | Gottschalk .................... | 188/218 XL |
| 2,141,164 | 12/1938 | Brehm .......................... | 192/107 |
| 3,376,960 | 4/1968 | Bender ......................... | 192/107 X |
| 3,376,961 | 4/1968 | Horner .......................... | 192/107 X |
| 3,403,759 | 10/1968 | Holcomb ...................... | 188/264 CC |

Primary Examiner—Benjamin W. Wyche
Attorneys—John D. Haney and Harold S. Meyer

ABSTRACT: A segmented friction member for a disc-type brake or clutch in which parallel spaced-apart segmented friction lining carriers are mounted on a unitary torque ring and hold segmented heat-absorbing material therebetween.

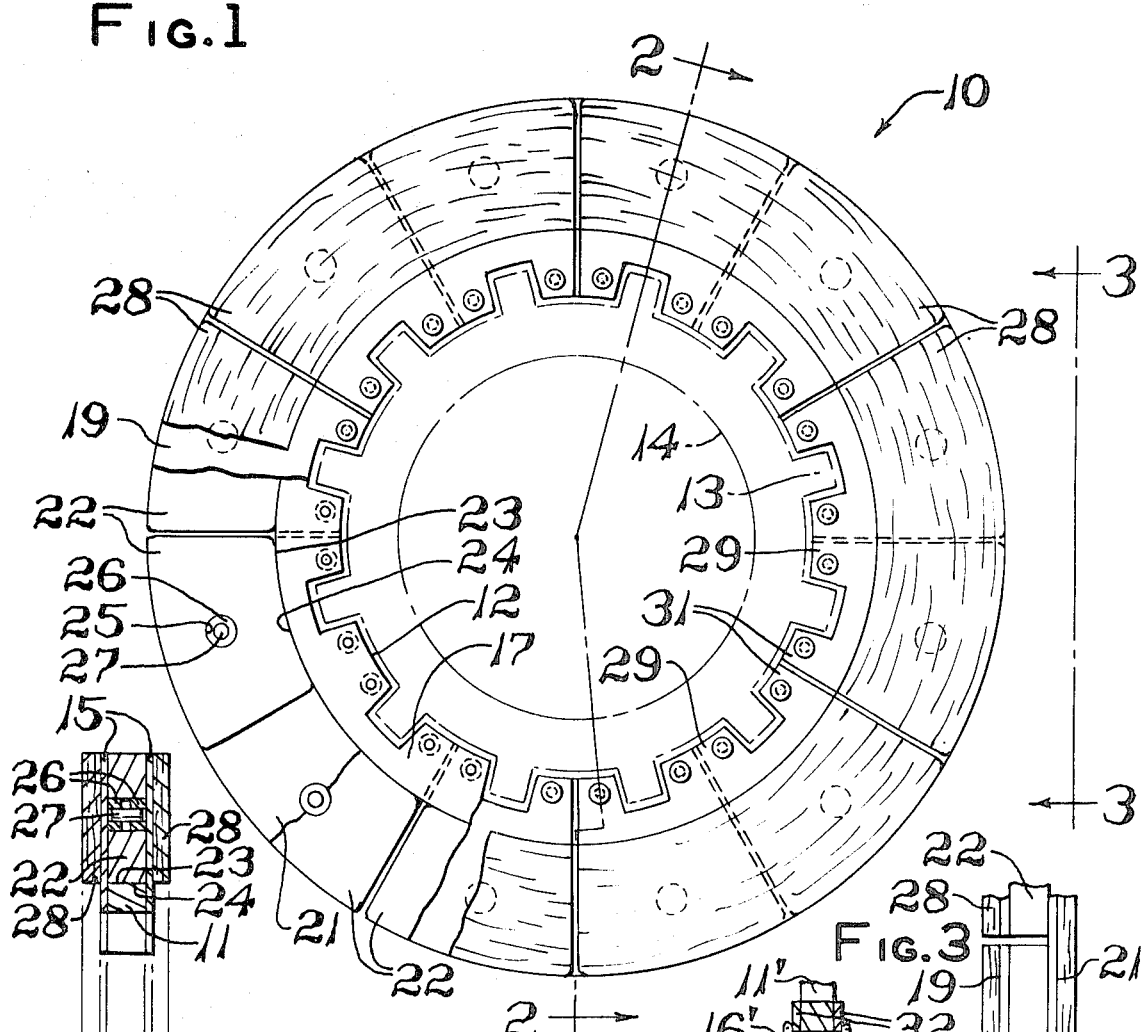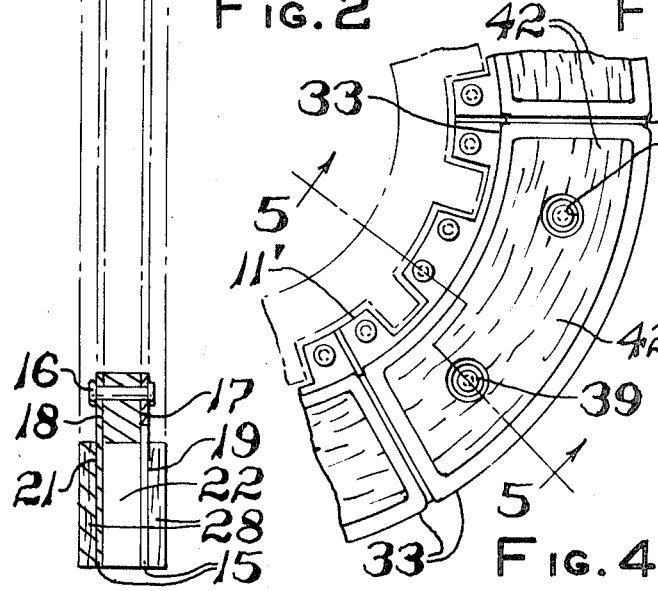

SEGMENTED FRICTION MEMBER FOR BRAKE OR CLUTCH

BACKGROUND OF THE INVENTION

This invention relates to annular friction members of disc-style brakes or clutches and especially to segmented friction members which utilize heat-absorbing material in segmental form. These friction members may carry friction linings for engagement with other brake members.

Relative rotation of friction members while in braking engagement generates a large amount of heat in applications such as high-energy aircraft brakes. In an effort to handle the high-heat loads imposed on brakes by modern aircraft, materials of high heat-absorbing capacity have been built into the brakes; however, some of the best materials for heat absorption do not have the structural properties needed to withstand the stresses imposed during braking. Furthermore, the temperature differentials to which the brake parts have been subjected has caused warping of practically all materials used which has resulted in malfunctioning or cracking of the brake parts. To overcome warping and cracking the disclike parts have been segmented. This has been effective but causes other problems because of the loss of in-plane stability provided by a continuous annular body. Different types of connecting structures have been tried; however, it has been difficult to provide a stable, unified segmented friction member in which material of high heat-absorbing capacity can be utilized to the maximum degree. In one construction the heat-absorbing body is segmented; however, the segments are connected directly through lugs or splines to the brake or clutch structure with resulting binding of the parts at the sliding surfaces. Excessive abrasion has also resulted because of the direct engagement of the segments with the sliding surfaces. In another construction, the segmented heat-absorbing annulus has circumferentially extending lugs at the ends which mesh with lugs of adjacent segments. The annulus is held together by a spider with radially extending arms retaining the segments in position after assembly. Here the problem has been the unstable nature of the friction member during assembly. In still another brake condition the principle connecting parts and structure has been located in the so-called "swept" area where the greatest heat is generated. This has resulted in dimensional variations as well as distortion and cracking of parts which are carrying the torque load.

SUMMARY OF THE INVENTION

According to this invention an annular friction member for a disc-type brake or clutch is provided in which a stable assembly is attained through the use of segmented heat-absorbing parts, a continuous unitary torque ring located outside the "swept" area and segmental facing members interconnected with the segments and the torque ring.

The torque ring has lugs at the inner periphery which engage a torque tube of a wheel or brake structure for transmitting torque to and from the friction member. Arcuate sector-shaped friction lining carriers or facing members are secured to the torque ring and extend radially outward forming two segmented discs with the heat-absorbing segments disposed therebetween. By overlapping the facing members of the two segmented discs and connecting them to arcuate sector-shaped segments of heat-absorbing material of approximately one-half the circumferential length of the facing members, a circumferential connection radially outward of the torque ring is obtained. This connection also serves to retain and hold the heat-absorbing segments in place without subjecting this material to excessive stress or wear.

Friction lining material may be secured to the outer radial faces of the facing members for engagement with other friction members upon actuation of a brake or clutch. This frictional engagement generates heat in the so-called heat-"swept" area located radially outward of the torque ring. In this "swept" area, the facing members and heat-absorbing bodies are segmental and therefore better able to adjust to the changes caused by the large differentials in temperature. At the same time the segments in this area are satisfactorily held together in a circumferential direction for in-plane stability.

With the torque ring outside the "swept" area the riveted connections to the facing members are not subjected to excessive thermal distortion and the spacing between the lugs at the inner periphery is maintained providing the dimensional stability required for sliding of the torque ring on the torque tube during operation of the brake or clutch.

In this construction a heat-absorbing material such as beryllium may be used for the segments although other materials having superior heat-absorbing properties may be used. Since the segments are held and protected by the facing members their structural properties do not limit their use and therefore maximum utilization can be made of these materials. The torque ring and facing members may be of a strong wear-resistant material such as steel.

The accompanying drawings show a preferred form of brake friction member made in accordance with and embodying this invention and which is representative of how this invention may be practiced.

BRIEF DESCRIPTION OF THE DRAWINGS

In the drawings:

FIG. 1 is an axial elevational view of the annular friction member assembly (shown in solid lines), certain parts being broken away, with the annular friction member being illustrated in torque-driving engagement with a related part which in this example may be a torque tube of a wheel-supporting structure, the sides of the torque tube being represented by the chain-dotted line;

FIG. 2 is a diametrical cross-sectional view of the assembly taken along the line 2-2 of FIG. 1;

FIG. 3 is a fragmentary side elevation taken along the line 3-3 of FIG. 1;

FIG. 4 is a fragmentary view like FIG. 1 of a modification of the invention; and FIG. 5 is a diametrical cross-sectional view taken along the line 5-5 of FIG. 4.

DETAILED DESCRIPTION

Referring to FIG. 1, friction disc assembly 10 includes an annular member such as torque ring 11 of steel or other strong wear-resistant material. At the inner periphery of the torque ring 11 are a series of spaced-apart lugs 12 projecting radially inward for engagement with mating interfitting driving pieces such as lugs 13 on an associated brake or clutch member which is represented in chain-dotted lines and which in this example may be a torque tube 14. This torque tube 14 is normally a nonrotating part attached to the wheel-supporting structure of an aircraft. It is understood that although this friction disc assembly 10 as shown in this embodiment is a nonrotating brake member, it could also be a rotating member with the torque ring 11 at the outer periphery and having a torque connection with a rotating wheel structure.

Arcuate sector-shaped segmental facing members such as friction lining carriers 15 which may be of steel or other strong wear-resistant material are secured as by rivets 16 to opposing radially extending faces 17 and 18 of the torque ring 11 forming segmented lining carrier discs 19 and 21. These carrier discs 19 and 21 extend radially outward from the torque ring 11 in spaced-apart parallel relationship. Interposed between the carrier discs 19 and 21 are arcuate sector-shaped segments 22 of heat-absorbing material. These segments 22 may be of beryllium or in a brake or clutch in which the heat capacity requirement is not as great as in a high-energy brake for aircraft, the segments may be of steel, aluminum or other suitable material. Each of the segments 22 has a circumferential length approximately one-half the circumferential length of the lining carriers 15 so that one lining carrier overlaps two segments. The lining carriers 15 of carrier discs 18 and 19 are of the same circumferential length and are secured to the torque ring 11 so that the lining carriers of carrier discs 18 overlap the lining carriers of carrier discs 19 by a distance equal to one-half the circumferential length of the lining carriers.

Each of the segments 22 has a curved inner peripheral face 23 for eating against an outer peripheral face 24 of the torque ring 11. Located radially outward of the inner peripheral face 23 of each of the segments 22 is an aperture 25 through the segment for receiving a fastener connecting the opposing lining carriers 15 of the carrier discs 18 and 19. In the embodiment illustrated in FIGS. 1 and 2, one form of fastener is shown in which cylindrical projections such as studs 26 fit in apertures 25 are secured as by spot welding to the carrier linings 15. Pins 27 which may be serrated or grooved are disposed in force-fit relation within the holes of the studs 26.

Friction lining material 28 is adhered to the outer radial faces of the lining carriers 15 and may be of the type described and set forth in U.S. Pat. No. 2,966,737 of R. E. Spokes et al. This friction lining material 28 is located radially outward of the torque ring 11 so that the so-called heat "swept" area is spaced from the torque ring 11. Accordingly, the thermal distortion of the torque ring 11 is at a minimum and there is greater dimensional stability of the torque ring with relation to the spacing of the torque ring lugs 12. This is further insurance that torque ring 11 will slide axially along the lugs 13 of the torque tube 14 without binding and excessive wear.

In-plane stability of the friction disc assembly 10 at the outer periphery and in the "swept" area is provided through the overlapping of the lining carriers 15 of the carrier discs 19 and 21 and the connection through studs 26 and pins 27 which bridge the gap between adjacent lining carriers. This overlapping relationship is illustrated in FIG. 3 which shows the segmented construction of the carrier discs 19 and 21 and especially the overlapping of the lining carriers 15 of these two carrier discs. It also illustrates the division of the heat-absorbing material into segments 22 which have one-half the circumferential length of the lining carriers 15.

As shown in FIGS. 1 and 2, the rivets 16 which fasten the lining carriers 15 to the torque ring 11 are located at the inner periphery of the torque ring and preferably in the lugs 12 of the torque ring which is in a position outside the "swept" area and in an area where there will be the least thermal distortion. It will be noted that each of the friction lining carriers 15 has a shape at the inner periphery corresponding to the shape of the torque ring 11 with lugs 29 of the same shape as the lugs 12 of the torque ring 11 and half lugs 31 which are substantially half the circumferential width of the lugs 12 of the torque ring 11.

In FIGS. 4 and 5 there is shown a modification in which the overlying friction lining carriers 32 have edges 33 which extend over the edges 34 of segments 35 of heat-absorbing material. These friction lining carriers 32 are secured to the torque ring 11' by rivets 16' in the same manner as the lining carriers 15 are secured to the torque ring 11.

Aperture 36 in the segment 35 is located in substantially the same position as the aperture 25 in segment 22. The faces of the lining carriers 32 are recessed around the apertures producing edges 37 surrounding the indentation. The friction lining carriers 32 also have corresponding indentations 38 which fit in the indentations and over the edges 37 of the segments 35. Rivets 39 pass through the apertures 36 in the segments 35 and connect the lining carriers 32. A sleeve of steel or other wear-resisting material is disposed between the lining carriers 32 and around the rivets 39. The outer wall of the sleeve is spaced from the wall of aperture 36 and in this way the torque forces transmitted through the rivets 39 and to which the segments 35 are subjected are kept to a minimum. This permits the use of frangible heat-absorbing materials such as beryllium in the segments 35.

It will also be noted that friction lining material 42 is secured to the radial faces of the lining carrier radially outward of the torque ring 11'; however, the indentations 38 in the lining carrier are not covered with the friction lining material so that access may be had to the rivets 39.

The rivets 39 and 16' clamp the segments 35 between the lining carriers 32 providing a construction in which the segments 35 of heat absorbing material are held firmly in position by the edges 33 of the lining carriers and the indentations 38 in the lining carriers fit within the edges 37 of the segment indentations. These lining carriers 32 are in the same overlapping relationship as those shown in FIGS. 1, 2 and 3 and therefore in-plane stability is obtained with this modification also.

The friction lining 42 of the modification shown in FIGS. 4 and 5 may be of the type described and set forth in U.S. Pat. No. 2,966,737 of R. E. Spokes et al. It is also understood that this invention may be practiced where the friction lining material is on another brake part with which the friction disc assembly 10 comes into engagement and is not attached to the lining carriers 15 or 32. In any case, the so-called "swept" area will be located radially outward of the torque ring 11 and 11' so that the advantages of having segmentation in this area and a continuous annulus in the torque ring outside this area will be obtained.

We claim:

1. An annular friction member for a brake or clutch comprising a ring which has lugs on one peripheral edge for effecting torque-transmitting engagement with related brake or clutch structure and a series of individual arcuately shaped facing plates supported by and on opposite sides of such ring, and segments of nonwearing heat-absorbing material between the plates and separate from them; the resulting assembly being characterized in that:
    a. said facing plates have lugs on one edge registering with and fastened to the torque-transmitting lugs on said ring; and
    b. said facing plates have portions extending away from said lugs generally in the plane of said ring which portions collectively define two annular opposing friction faces of said friction member; and
    c. said facing plates are staggered on opposite sides of said ring so that each facing plate arcuately overlaps the adjoining portions of two corresponding facing plates on the opposite side of the ring; and
    d. each facing plate is connected to the two overlapped portions of its opposing facing plates by two fasteners which extend through said segments of heat-absorbing materials.

2. An annular friction member according to claim 1 in which said arcuately shaped facing plates are all of identical size and shape so that they can be used interchangeably on opposite sides of said ring.

3. An annular friction member according to claim 1 in which said segments of heat-absorbing material are all of identical size and shape but proportioned so that each arcuate facing plate axially abuts two of said segments.